US009534887B2

(12) United States Patent
Einola et al.

(10) Patent No.: US 9,534,887 B2
(45) Date of Patent: Jan. 3, 2017

(54) METHOD AND ARRANGEMENT FOR MEASURING TIMBER

(71) Applicant: PONSSE OYJ, Vieremä (FI)

(72) Inventors: Kalle Einola, Tampere (FI); Mikko Miettinen, Lempäälä (FI); Tuomo Moilanen, Kajaani (FI)

(73) Assignee: PONSSE OYJ, Vieremä (FI)

( * ) Notice: Subject to any disclaimer, the term of this patent is extended or adjusted under 35 U.S.C. 154(b) by 0 days.

(21) Appl. No.: 14/895,403

(22) PCT Filed: Jun. 5, 2014

(86) PCT No.: PCT/FI2014/050456
§ 371 (c)(1),
(2) Date: Dec. 2, 2015

(87) PCT Pub. No.: WO2014/195585
PCT Pub. Date: Dec. 11, 2014

(65) Prior Publication Data
US 2016/0138905 A1   May 19, 2016

(30) Foreign Application Priority Data

Jun. 5, 2013  (FI) .................................... 20135625

(51) Int. Cl.
*G01B 11/02* (2006.01)
*G01B 11/10* (2006.01)
(Continued)

(52) U.S. Cl.
CPC ........... *G01B 11/105* (2013.01); *G01B 11/043* (2013.01); *A01G 23/099* (2013.01)

(58) Field of Classification Search
CPC ....... G01B 11/02; G01B 11/043; G01B 11/24; G01B 11/28; G01B 11/046; G06K 9/00664; G01N 33/46; G01N 21/8986; G01N 2201/0238
(Continued)

(56) References Cited

U.S. PATENT DOCUMENTS 3,862,496 A * 1/1975 Rysti .................. G01B 5/06
209/519
4,891,530 A * 1/1990 Hatji ................... G01N 21/89
250/559.4
(Continued)

FOREIGN PATENT DOCUMENTS

EP    2 489 978 A1    8/2012
WO   WO 02/13597 A1   2/2002
(Continued)

OTHER PUBLICATIONS

Park et al., "3D Log Recognition and Pose Estimation for Robotic Forestry Machine," 2011 IEEE International Conference on Robotics and Automation, May 9-13, 2011, pp. 5323-5328.
(Continued)

*Primary Examiner* — Hoa Pham
(74) *Attorney, Agent, or Firm* — Birch, Stewart, Kolasch & Birch, LLP

(57) ABSTRACT

An arrangement and method for measuring a piece of timber in a wood handling machine, wherein the piece is grabbed by a cutting head arranged to a set of booms in the wood handling machine, and the dimensions of the piece are measured by at least one measuring device in the wood handling machine. A measuring signal field formed by one or more measuring beams is also directed to the piece of timber with a monitoring device utilizing contact-free measurement, and a point cloud to be stored is provided by the measuring signal field it produces. The parts to be identified
(Continued)

are identified from this point cloud, and a quantity to be measured is defined and formed of the information content of the point cloud. The obtained result is directed to a measuring system in the wood handling machine for further utilization.

20 Claims, 4 Drawing Sheets

(51) Int. Cl.
*G01B 11/04* (2006.01)
*A01G 23/099* (2006.01)

(58) Field of Classification Search
USPC ...... 356/601–623, 625–635, 243.1; 144/335, 144/356, 4.1
See application file for complete search history.

(56) References Cited

U.S. PATENT DOCUMENTS

| | | | |
|---|---|---|---|
| 8,072,617 B2* | 12/2011 | Havimaki | A01G 23/00 144/335 |
| 8,306,941 B2* | 11/2012 | Ma | A01G 23/00 702/2 |
| 2005/0133115 A1* | 6/2005 | Gatz | A01G 23/08 144/357 |
| 2006/0061566 A1* | 3/2006 | Verma | G06T 17/20 345/419 |

FOREIGN PATENT DOCUMENTS

| | | |
|---|---|---|
| WO | WO 2004/020938 A1 | 3/2004 |
| WO | WO 2006/092469 A1 | 9/2006 |
| WO | WO 2006/126952 A2 | 11/2006 |
| WO | WO 2008/025881 A1 | 3/2008 |
| WO | WO 2008/117263 A2 | 10/2008 |
| WO | WO 2012/087220 A1 | 6/2012 |

OTHER PUBLICATIONS

Rossmann et al., "Realization of a Highly Accurate Mobile Robot System for Multi Purpose Precision Forestry Applications," International Conference on Advanced Robotics, Jun. 22-26, 2009, 6 pages.

* cited by examiner

METHOD AND ARRANGEMENT FOR MEASURING TIMBER

BACKGROUND OF THE INVENTION

The present invention relates to a method for measuring timber in accordance with the preamble of claim 1.

The invention also relates to an arrangement for measuring timber in accordance with the preamble of claim 9.

The present invention provides contact-free measurement of timber, whereby the method and arrangement can be applied not only to measuring timber during work, but also to making the measurement of timber in a wood handling machine more precise and to calibrating timber measuring devices known per se, for example.

In modern mechanical logging, especially in logging known as cut-tree or cut-to-length (CTL), ever greater requirements are set for the precision of measurement in the dimensions of the handled timber. In part, this is due to the fact that a great deal of timber trade is today based on measuring data collected automatically by a wood handling machine. A certain requirement for precision is then already established by legislation that relates to measurement in the timber trade. On the other hand, especially in logging based on the cut-to-length system, the benefits of precise measurement are emphasized when an entire tree trunk is considered in terms of after-felling optimization that provides the best possible use of the raw material.

Conventionally, mechanical logging requires at least the measurement of the diameter and length of the tree trunk or pieces cut from it. The measuring is done at a certain precision and allowed uncertainty of measurement.

During logging, the diameter of a piece of timber is measured generally by using mechanical tools that are set against the outer surface of the piece and that follow the outer surface during logging by measuring for instance the position of feeding and/or delimbing elements in relation to the body of the cutting head of the wood handling machine for the purpose of measuring the diameter. In measuring the length of the piece of timber, it is, in turn, common to use a hodometer that is pressed against the outer surface of the tree trunk and rolls along it as the tree trunk moves in the wood handling device. Thus, the hodometer measures the distance it travels on the outer surface of the tree trunk.

The methods described above are based on assumption and a measuring principle, in which an essentially round tree trunk is continuously in contact with the means used in measuring.

Common to all used measuring methods is that their precision needs to be regularly monitored. Measuring devices used in measuring the diameter and length of a piece of timber, for instance, need to be calibrated from time to time.

According to the prior art, a measuring device of a wood handling machine is calibrated for the diameter by means of specific calibration scissors and for the length by means of a conventional measuring tape, for instance, which requires a great deal of awkwardly performed manual work. It is worth mentioning, in particular, that, in practice, harvester work needs to be stopped completely for a time, when the operator has to come out of the control cabin of the forest machine to perform calibration measurements manually. When processing timber with a wood handling machine within its working area to cut them into desired lengths, the required calibration can be done in different ways. The operator of the wood handling machine then stops the machine after a chosen time and steps down to measure some of the sawn pieces. To do this, he also needs to know exactly the order, in which the pieces on the ground have been processed. Alternatively, the logging control and monitoring system of the forest machine is adapted to indicate the need to start a verifying measurement in connection with a random tree trunk.

Pieces of timber that are included in the calibration sample are measured in length, with a measuring tape, for instance, and diameter, with a large slide gauge, for instance, at as many points as deemed necessary. Today, the diameter is also generally measured using electronic calibration scissors made for this purpose as well as calibration gauges with means for automatically storing the measuring data and usually also a display for displaying the measuring data immediately to the person performing the calibration. Said electronic calibration scissors known per se can also operate interactively with the operator and indicate where the next calibration measurement should be taken.

In measuring the diameter of a tree trunk, errors are caused especially by a possible deviation in the shape of the cross-section from the ideal round shape, a varying and uneven surface pressure used in the measuring, and random errors caused by the person performing the measuring, for example. It is also possible that the person performing the calibration measurement mixes up two or more of the pieces of timber intended for calibration. The calibration may then provide a result that is notably false. This possibility of error is also furthered by the fact that calibration measurements are often performed in bad weather and lighting conditions. Pieces of timber may also roll to a different location on the ground than where the operator of the machine endeavours to place them. Problems in calibration measurement are also caused by the fact that pieces of timber often sink so deep in the snow or undergrowth that a proper cross-measure needed for the measuring cannot be measured. In addition, weather conditions, especially the melting and freezing of timber may affect the measuring result to some extend in calibration, too, not to mention the measuring performed by the harvester head.

In measuring the length of a tree trunk or pieces of timber, many other drawbacks also cause measuring errors. It should especially be kept in mind that the pieces of timber that are measured are more or less in the shape of a cut cone. This is a matter that unfortunately is often left unnoticed in the prior art. In other words, when calibrating a measuring device, the length of the outer or envelope surface of a piece of timber is often accidentally measured at some point of the surface of the piece. Thus, it is possible that the measuring tape is positioned parallel to the envelope of the cut cone of the tree trunk and the length value, thus, becomes greater than the length of the centre axis of the piece. The measuring of the calibration value for a desired length is done primarily visually and by free hand by keeping the measuring tape beside the piece of timber and trying to hold the measuring tape visually parallel to the centre axis of the piece.

The surface of a tree trunk often also has various problem and discontinuity points, such as stubs or a notably warped section, which may also cause errors in the measuring result. It is also possible and even probable that the ends of the piece of timber are not sawn fully perpendicular to the centre axis of the tree trunk. Especially a cut sawn on a butt log during felling or a cut in a warped piece of timber may differ quite a lot from an assumed ideal surface that is perpendicular to the centre axis of the piece.

In addition to the above-mentioned conventional measurements, requests have been made to be able to measure a few qualitative properties in terms of wood processing immediately during mechanical logging work. The determination and identification of knottiness, dry content, growth rate, growth ring structure and density, age, and especially factors diminishing quality, such as warp, rot, or some other defects, have been presented as additional information of interest.

In the prior art, monitoring and measuring qualitative properties of a piece of timber are done primarily visually, while it is the most important and, at the same time, most burdening work assignments for a user of a wood handling machine. A skilful user of a wood handling machine is able to estimate and monitor several different factors that affect the quality and value of the timber being processed in such a manner that it does not disturb efficient working. However, it is clear that as mechanical logging becomes more common and moves to new geographical areas, difficulties will be encountered in finding enough operators who are capable of quality determination and demanding, fast-paced decision-making. Therefore, there is a definite need for the automatization of the determination of quality properties in a piece of timber.

BRIEF DESCRIPTION OF THE INVENTION

It is thus an object of the present invention to develop a method and an arrangement implementing the method, in which the above-mentioned measurements and verifying measurements of the measuring devices can be performed as simply and precisely as possible.

This object is achieved by providing the method and arrangement for measuring timber with the characteristics defined in the claims of the present invention. More specifically, the method of the invention is mainly characterised by what is stated in the characterising part of claim 1. The arrangement of the invention is, in turn, mainly characterised by what is stated in the characterising part of claim 9.

Preferred embodiments of the invention are disclosed in the dependent claims.

Therefore, the invention is based on the idea that the use and calibration of devices, means and systems for measuring timber in a wood handling machine, especially harvester and its wood processing device, or cutting head, can be performed as flexibly as possible as part of the normal logging work without needing to take any extensive special action during the processing of the piece of timber, which would essentially diminish the productivity of logging.

The invention provides considerable advantages. Thus, the calibration of a measuring device in a wood handling machine becomes easier and faster, when the monitoring of timber can be done without stopping the wood handling machine and, in particular, without stepping down from it. The present solution also does not require bringing the tree trunk to a separate measuring unit, which would naturally also slow down the work. This way, the downtime and idle time of a valuable forest machine can be essentially reduced to, thus, improve the cost-efficiency of the machines.

The solution of the invention also improves the work safety and ergonomics of the operator of the wood handling machine, because moving between the control cabin and the surroundings of the machine is essentially reduced in comparison with conventional calibration done on the ground. It should be noted that a significant part of work-related accidents in mechanical logging is slipping and falling from the steps of the work machines and other walkways or stumbling in the terrain surrounding the wood handling machine.

With the present method and arrangement, the sampling of timber, various measurements and calibration measurements of measuring devices will always be performed in essentially the same manner, which means that a major part of human errors caused by the person doing the measuring are eliminated.

With the system of the invention, including individual trunks in the measuring sample does not cause additional problems and hardly any extra time for processing in comparison with the normal work process. For some of the pieces of timber or tree trunks, just one work phase is added to the conventional felling and crosscut sawing as well as feeding and delimbing. At the same time, any systematic and random errors that have caused uncertainty in the calibration can be entirely eliminated or at least their effect significantly reduced.

It is even possible to provide an arrangement that automatically and substantially continuously monitors the precision of the measuring devices. In case of inconsistencies in the measuring results or if there are other reasons to doubt the precision of the measurement, the arrangement begins, without a separate request, to perform a calibration measurement or at least informs the operator of the machine that there is a possible quality problem with the trunk.

The arrangement and method of the invention can also, on the basis of the data it has measured and analysed, suggest to the operator actions, with which the negative effect of a quality defect, such as a warp in the trunk, on the quality of work can be reduced. A system arranged in a forest machine can, for instance, inform the operator, at which cut-off point the trunk or log originally intended to be cut on the basis of a cutting instruction should be divided so as to remove or at least minimize the problem caused by the warp. Said cut-off point is preferably located at a point where the log originally intended for cutting is most warped, assuming that it is possible to produce as useful and valuable pieces of timber as possible for the wood-processing industry on both sides of the cut-off point. A measuring device and information system of a harvester that cross-cuts in a manner known per se is capable of doing this, as long as they are informed of a deviation from the original crosscut point due to quality reasons. At this moment, this work phase is typically done by the operator of the machine.

The arrangement of the invention and the related method are simple to learn to use and can be installed in both new wood handling machines and in ones already in use. This type of calibration system can naturally be integrated as an independent or fixed part of the information system in a forest machine, if so desired.

When the measuring devices of a wood handling machine are always calibrated and reliable, it is possible to improve the use of timber raw material even further. Thus, a tree trunk can already be cut in the forest to an as precise measurement as possible, whereby current, partly unnecessarily large trimming allowances can be avoided. This way, the saved amount of timber raw material can be easily calculated and shown to be significant in terms of quantity. A high precision in length and diameter measurement are prerequisites for a fast and successful value bucking that is a conventional way of selecting the cut-off points of a tree trunk to achieve an as high a value for the timber raw material as possible.

Other advantages of the invention are disclosed in the following, where specific embodiments of the invention are described in more detail.

BRIEF DESCRIPTION OF THE DRAWINGS

In the following, some preferred embodiments of the invention will be explained in more detail with reference to the accompanying drawing, in which.

DETAILED DESCRIPTION OF PREFERRED EMBODIMENTS

The present figures do not show the method and arrangement for measuring timber in scale, but the figures are schematic and illustrate the structure and operation of the preferred embodiments in principle. Structural parts indicated by reference numbers in the accompanying figures then correspond to structural parts provided with reference numbers in this specification.

Figure 2:
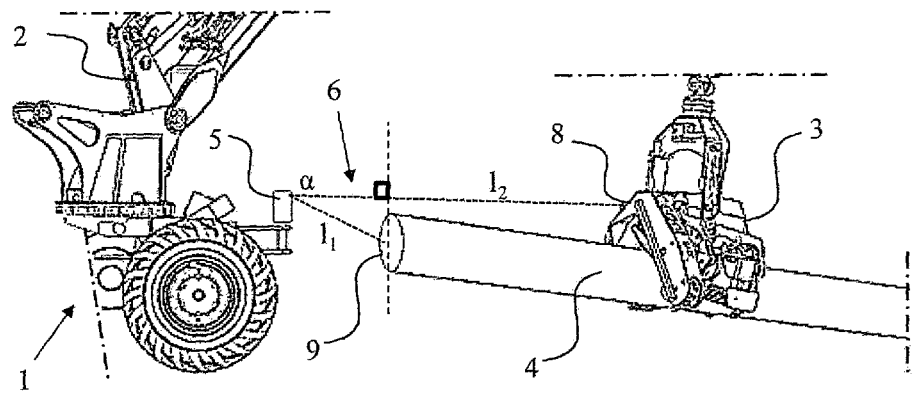
FIG. 2 shows schematically the operating principle of the present invention.
Figure 3:
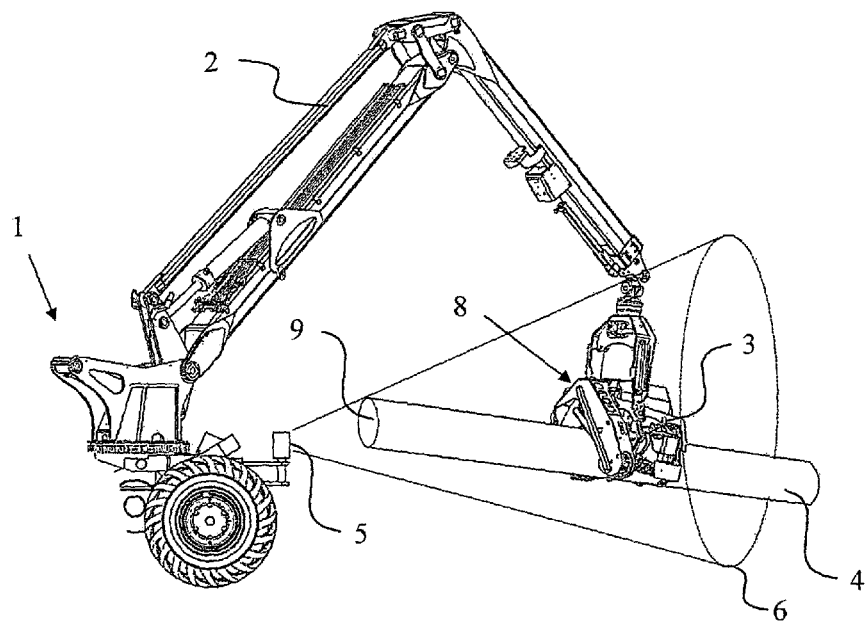
FIG. 3 shows schematically the operating principle of another embodiment of the present invention.

FIGS. 2 and 3 show a wood handling machine 1 known per se, which comprises a wood handling device moved by a set of booms 2. In this embodiment, the device is formed by a cutting head 3, with which the tree is felled and processed to form one or more pieces of timber of the handled tree trunk 4. This cutting head has conventional measuring means known per se that follow its surface in contact with it to measure the diameter and length of the piece of timber during handling and are not shown in more detail herein.

FIGS. 2 and 3 further show second monitoring means 5 in the wood handling machine 1, with which the properties of the piece of timber can be defined preferably by photogrammetric methods without contact. With these monitoring means, it is possible to determine the diameter and shape of the end of the piece, the diameter and shape of the cross-sectional surface of the piece even in other parts of the longitudinal axis of the piece, and the length of the piece. In other words, the present solution can essentially define the three-dimensional geometry of the tree trunk 4 held by the cutting head 3 and fed to extend therefrom, as well as the dimensions of the tree trunk. This type of contact-free measuring can be done for example by a laser-operated measuring means or a suitable camera system, such as a stereo camera or distance camera. Both two- and three-dimensional measuring data can be produced with these devices.

The measuring can be done using the wavelengths of visible light and, as necessary, on other electromagnetic wavelengths, such as infrared, ultraviolet or x-ray wavelengths, depending on the measuring results required.

Even though FIGS. 2 and 3 show the monitoring means in the vicinity of the set of booms 2 of the wood handling machine, this does not limit its location to just this one. Taking the sensitivity of the monitoring means into consideration, it might even be more preferable to install it in the control cabin (not shown) of the wood handling machine, where it would be protected from impacts that otherwise might be directed to it. In such a location, the monitoring means also remains clean, while it is guaranteed an unobstructed access to the area to be measured. This type of monitoring means 5 operates in such a manner that one or more measuring beams 6 are directed to the object being measured, which in this case is a tree to be felled. Such measuring beams are, in FIG. 2, represented by beams $l_1$ and $l_2$ and, in FIG. 3, the conical measuring space 6. By following the measuring beams, a two- or three-dimensional point cloud 7 is obtained of the target in accordance with the measuring objective, the likes of which are shown by way of example in FIGS. 4 to 8. The obtained point cloud may have the most versatile shapes. Thus, it may be formed of a full point space or a view-point of the monitoring means. The point cloud can also be obtained in such a manner that the monitoring means first detects a target of interest to be measured at a rougher resolution, after which the measuring beams are directed again to this limited partial space at a higher resolution or by using a slower movement of at least one motion axle of the monitoring means, for example.

When using a close-range laser scanner, for instance, the monitoring means 5 transmits from a zero point a laser beam 6, with which the distance of the target from the monitoring means is measured. In close-range laser scanners based on the propagation time of light, the distance is measured during the time the light signal propagates from the measuring device to the target and back. This way, individual coordinates can be obtained for each measured point. In addition to the co-ordinates, the system may also store an intensity value for each point on the basis of the strength of the return signal. On the basis of this intensity, it is possible to distinguish in a manner known per se the surface texture of the target being measured, for instance. As a result of the measurement, a three-dimensional point cloud 7 is produced, from which a digital three-dimensional surface model or a triangulation net, for instance, is formed of the tree trunk. The piece being examined can be scanned in the manner described above in one go, but scanning can also be done several times to better collect information on every side of the piece being examined. The thus obtained separate point clouds can then be combined into one entity.

Good qualities of a device based on laser technology in this type of outdoor measuring are, for instance, the fact that sun light or any other variations in the lighting conditions do not easily interfere with the measuring, unlike what often happens with a camera-based computer vision system, for example.

When utilising a laser-operated monitoring means 5 based on a single laser beam in measuring, the precision of such a single measuring beam is significantly high. The arrangement also provides very accurate distance measurement data. However, weaknesses in this type of device are often the slowness of the measurement and the focusing of the beam. With this type of device it may, however, be preferable to take a suitable number of measurements of the tree trunk 4 surface to obtain a more reliable measuring output, and the measuring signals may be averaged to provide a desired point cloud.

Correspondingly, by using a ready-made commercial laser scanner, the measuring beam is automatically controlled typically by means of a mobile mirror system, in which case a large number of measurements are quickly taken over a wide view-point. These scanners are manufactured as both 2D and 3D scanners, and as devices measuring several 2D levels, especially for vehicle use.

Also, in a manner known per se, it is possible to implement 3D laser scanner properties with technology based on a 2D laser scanner by making the scanner move and by simultaneously measuring the position of the added degree of freedom and the measuring data, after which a point cloud 7 of a 3D measurement is obtained by combining the data.

Close-range laser scanners are also known that return more than one reflection from each point of the measuring beam, and this property may facilitate the use of the measuring device in conditions, where obstacles, such as small branches, foliage, leaves, or disturbances, such as water drops or snowflakes, caused by the prevailing weather conditions occur on the path of the measuring beam. This way, the several signals returned by the monitoring device can be interpreted in a more versatile manner and filtered to obtain more reliable measuring and calibration data, for instance.

By utilising the coordinates of the point cloud 7, the shapes of the target can be modelled in a manner known per se, in which case the precision and reliability of the modelling is dependent on the type and number of the monitoring devices. Naturally, if only the end and one of the envelope surfaces of the tree trunk are visible, some assumptions need to be made and the geometry of the reverse side of the tree needs to be estimated. However, a precise measuring in comparison with the present measuring ways is possible even with this implementation. But if said measuring point cloud can be formed to comprise the entire tree trunk, in which case even the shape of the surface in the shadow area can be reliably measured, the total precision of the measuring can naturally be improved quite considerably.

Figure 1:
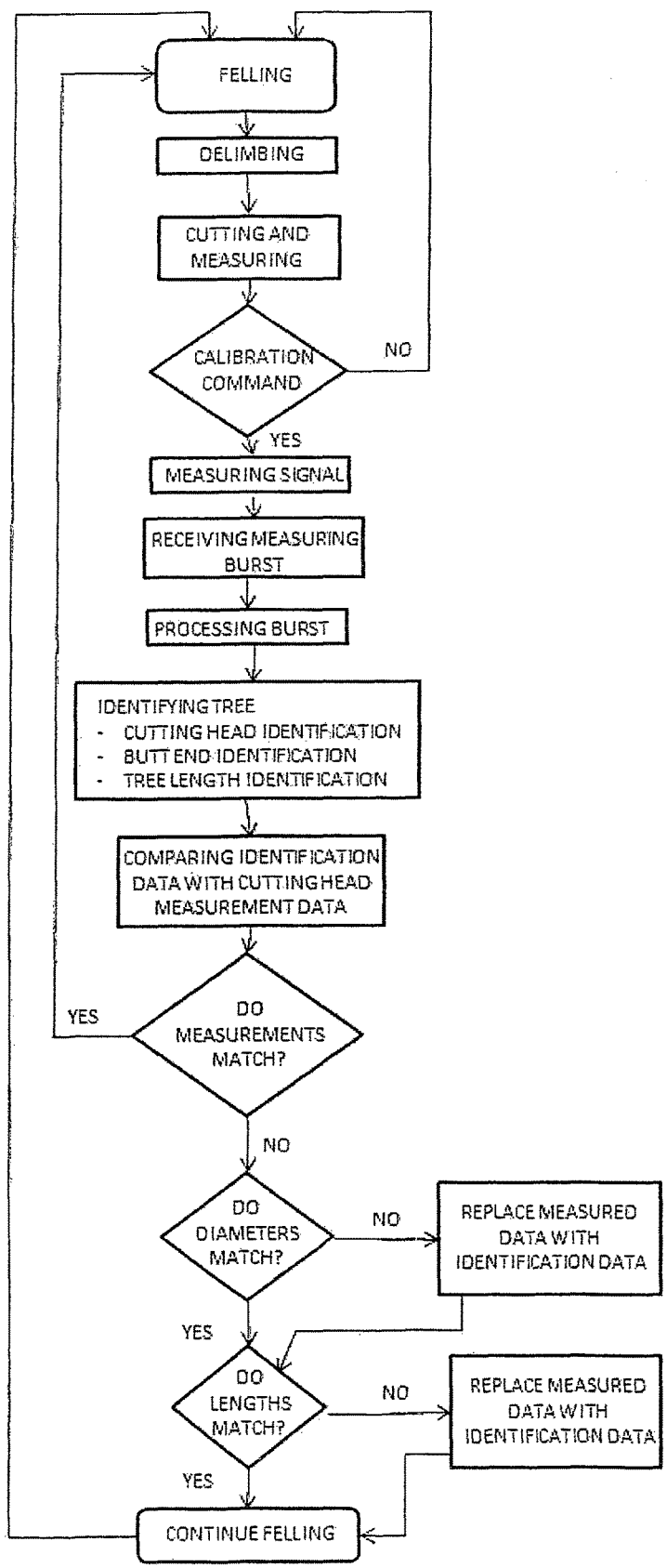
FIG. 1 shows a block diagram of a method related to the measuring of timber.

The above method for observing a piece of timber 4 with different monitoring means 5 is preferably utilised in the manner shown schematically in FIG. 1. In such a case, the felling and delimbing of a tree trunk are followed in a conventional manner by cutting the tree trunk and measuring the produced pieces of timber, and this cycle is repeated until work in the logging area is completed. The work cycle also includes as an essential part the calibration of the measuring devices, which can be substantially simplified by the present contact-free measurement.

Then, a calibration command received prior to felling, during felling or the work phases following it evokes the initialization of a monitoring means 5 and transmission of a measuring signal 6 toward the tree trunk or some other piece of timber 4 being handled. The monitoring means receives a measuring burst produced by the measuring signal, processes it and produces from it the point cloud 7 described above. The cutting head supporting the tree trunk or part thereof, the butt end of the tree trunk, the length of the tree trunk and other possible geometrical shapes of the tree trunk or piece of timber, for instance, are identified from this point cloud.

Reference data are retrieved from the results of the point cloud 7 for the dimensions that the cutting head measures during operation with conventional contacting measuring means. The measuring data produced by the monitoring means—or identification data, as they are called in the figures—are then compared with the measuring data of the measuring means so as to determine whether the obtained two measuring values correspond to each other. When a possible deviation occurs, the measuring value provided by the measuring means is corrected with the measuring value provided by the monitoring means. The action is repeated on all desired measuring values. Finally, the operation of the measuring means of the cutting head is adjusted to take into consideration any deviations in the measuring values revealed during the comparison.

It is also possible to let the monitoring means monitor more or less continuously the properties of the tree trunks to be felled or the pieces of timber 4 to be handled. This way, the measuring values of the measuring means can be corrected even afterward. Thus, the present arrangement can also be arranged to warn or caution about a possible detected calibration need, but the decision on performing the calibration is left to the operator. If necessary, the arrangement may even prevent the continuation of work, if there is reason to suspect that the measuring means do not work in a satisfactory manner or at a satisfactory precision.

The arrangement can also be adapted to suggest a correction value to be used in calibration or, when the operator allows, to have the measuring device display the corrections automatically.

The present arrangement for measuring the length of a tree trunk 4 or a piece of timber cut from it, thus, works in the following manner with reference to FIG. 2.

At least one monitoring means 5 produces at least one measuring beam 6 to direct to the tree trunk 4 or piece grabbed by the cutting head 3 of the wood handling machine 1. If necessary, a reference level 8 on the cutting head 3 is arranged to be identified from the point cloud 7 produced by a measuring signal field. This reference level may be a conventional plane surface of the cutting head that can be easily distinguished from the point cloud or a part thereof or a reflection surface provided for this purpose, etc. Next, an end surface 9 of the piece of timber between the cutting head and monitoring means 5 is identified from the point cloud. After the end surface and reference level have been identified, it is possible to calculate the distance between these points.

$$l = l_2 - \cos \alpha \times l_1 + k,$$

where $l_1$ = a lower distance measured by the monitoring means from the monitoring means to the end surface of the piece of timber, $l_2$ = a higher distance measured by the monitoring means from the monitoring means to the reference level of the cutting head, k = the distance from the reference level to a saw flange, α = the angle between the measuring beams of the monitoring means, l = the length of the piece of timber.

In practice, the measuring is done in such a manner that after the end surface 9 of the piece of timber 4 has been identified, its diameter is defined as a first calibration measurement of the diameter of the piece of timber being measured. Next, the calculated distance l between the reference level 8 and end surface of the cutting head of the piece of timber is defined as a second calibration measure.

Figure 4:
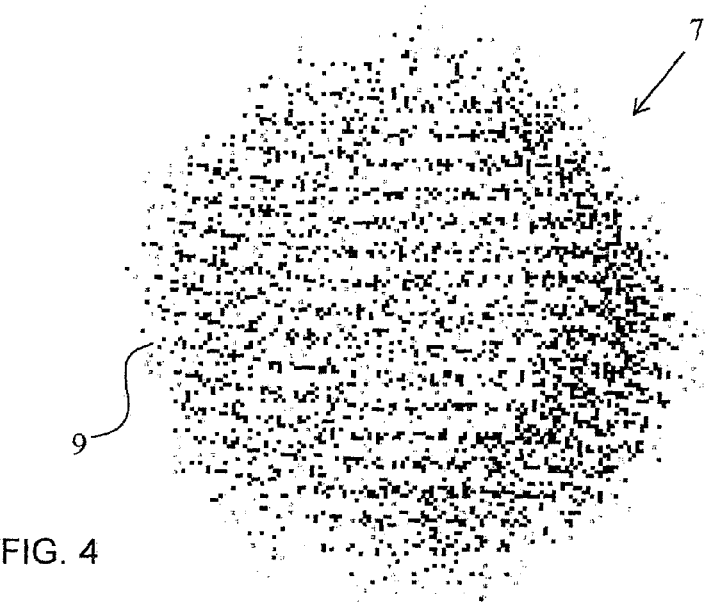
FIG. 4 shows measuring points made by a measuring directed to the head of a piece of timber.
Figure 5:
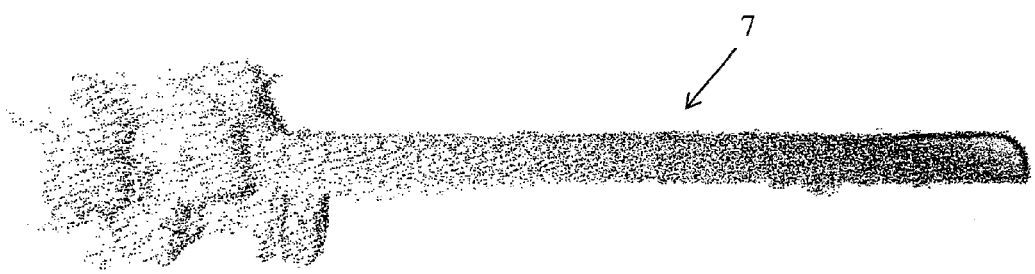
FIGS. 5 to 7 show measuring points made by a measuring directed to the length of a piece of timber.
Figure 6:
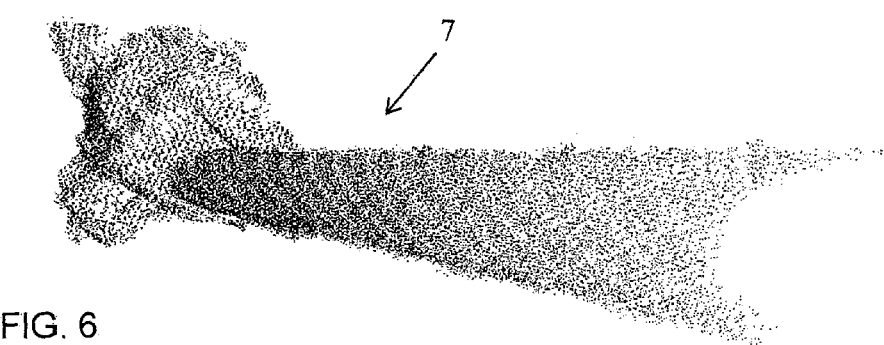

To find the end surface 9 of the piece of timber 4, the measuring software is used to define the starting level of the point cloud 7, which is usually formed by the first level with enough measuring points to calculate a beam. This type of point cloud is shown in FIG. 4. The end level of the measuring signal field is then formed by the point of the saw housing on the cutting head, the distance of which from the saw flange is known.

When the start and end levels are defined, the calibration values of the shape of the piece of timber 4 are compared with the measuring values provided by the cutting head 3 as the logging continues, and any correction needs caused by the calibration values of the defined shape of the piece of timber are estimated in relation to the measuring data of the piece of timber provided by the wood handling device.

If the calibration values of the diameter of the piece of timber 4 obtained from the measuring signal field provided by the monitoring means 5 differ from the measuring result obtained from the actual diameter measuring device on the cutting head 3, the obtained diameter value based on the measuring signal field of the piece of timber is applied to calibrate the diameter measuring device of the wood handling machine 1. Similarly, if the calibration values of the length of the piece of timber 4 obtained from the measuring signal field provided by the monitoring means 5 differ from the measuring result obtained from the actual length measuring device on the cutting head, the obtained length value based on the measuring signal field of the piece of timber is applied to calibrate the length measuring device of the wood handling machine.

Differing from the point or fan-shaped measurement described above, it is also possible to utilise a scanning producing a three-dimensional result in accordance with FIG. 3. This measuring method called laser scanning is used to obtain dimensionally accurate three-dimensional data without contact with the target. Usually this technique is implemented with laser beams. A measuring scanner serving as the monitoring means then transmits laser beams in a dense raster or network of measuring beams. As the beams return from an obstacle, the scanner measures the distance from the obstacle and calculates the coordinates of the reflection point. At the same time, the intensity of the returning beam is also measured. By scanning the target from several directions with one or more monitoring means, the point clouds 7 obtained as measuring results can be combined into one file to be processed. The combination provides a three-dimensional computer model with a point positioned at each reflection point of a beam. With these points, a three-dimensional surface of the target can be outlined in the point cloud.

Figures 7, 8:
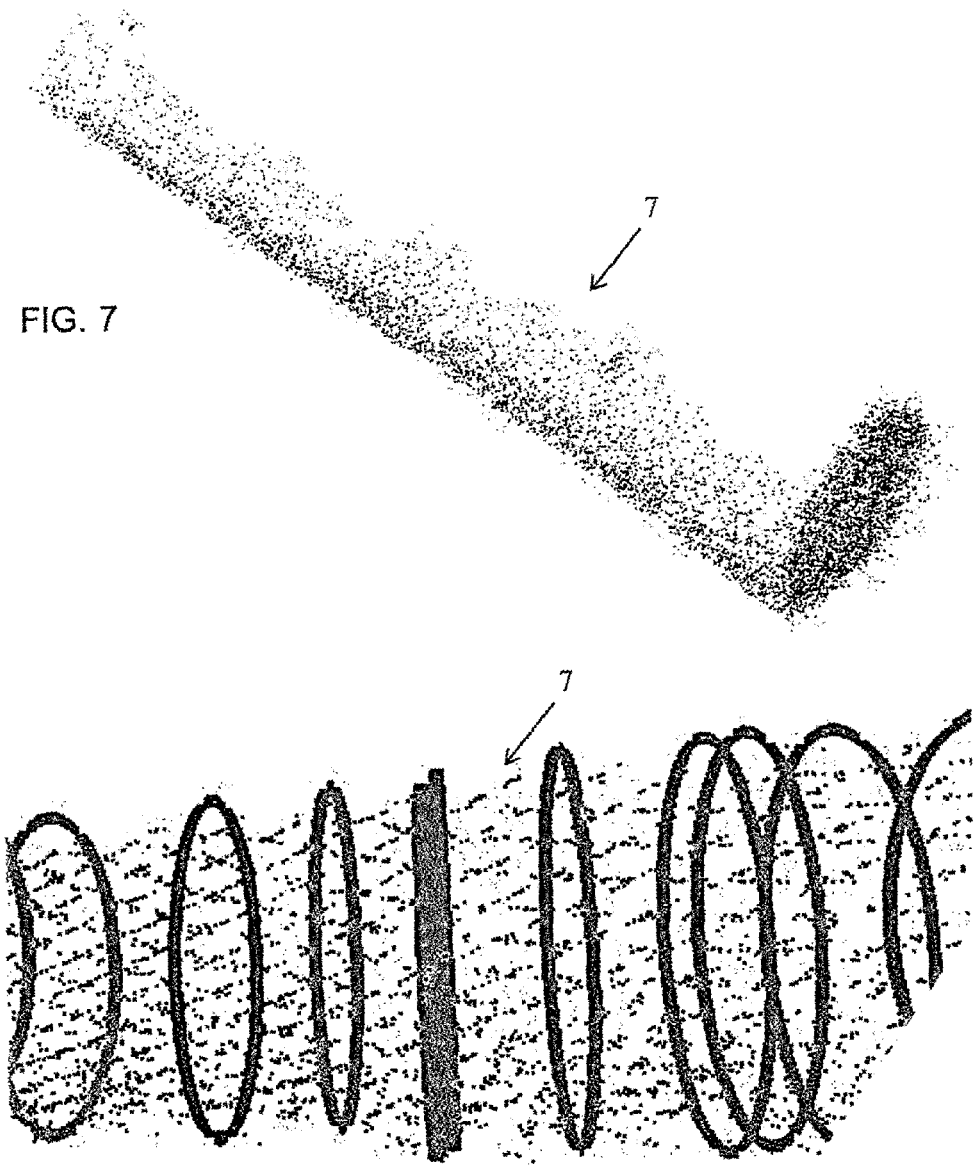
FIG. 8 shows measuring data obtained by calculated processing of the measuring points of a piece of timber.

In this type of three-dimensional measuring method, the piece of timber 4 is grabbed by a cutting head 3 on the wood handling machine and arranged on its set of booms 2, after which a measuring signal field of at least one monitoring means is directed to the piece of timber to determine the different dimensions of the piece of timber. A measuring signal field of a monitoring means utilising contact-free measurement is then directed to the piece of timber, which results in a point cloud 7 that is stored in the memory of the present arrangement. Next, the part to be identified from the piece of timber will be identified from this point cloud. These parts may be the diameter, that is, the diameter of the end surface, of the piece of timber, or its length. In addition, the diameter of the piece of timber along its entire length can be determined by measuring points on the outer surface of the piece and by arranging these on an assumed outer surface of a piece of timber, for instance. This surface is preferably formed of parts that are substantially in the shape of a cut cone and positioned after each other in the longitudinal direction. The operation is shown in FIG. 8. From these, it is possible to determine, for instance, whether the variation of the computational centre point of the longitudinal cross-section of the piece of timber is ideal, that is, possible curvature of the piece in relation to its longitudinal axis, or so-called warp, or the deviation of the cross-section from round. If necessary, a reference structure forming a part of the wood handling machine is identified from the point cloud, which facilitates the definition of the measure of length, for example.

When the quantity to be measured has been decided on, it is formed of the piece of timber shown by the coordinates of the point cloud 7, after which the result is directed to a measurement system in the wood handling machine for further analysis.

For instance, when analysing the warp of a piece of timber, measuring points representing the geometry of an envelope surface formed by the outer surface of the piece of timber are selected as the quantity to be measured in such a manner that they are defined from more than one point of the length of the piece. The obtained separate data are then compared with the geometrical ideal measurements of the piece of timber. Finally, the deviations obtained as a result of the comparison can be recorded into the measuring system to be transmitted onward as quality data of the timber.

Measuring results obtained by the present method should preferably be compared with conventional measuring results obtained by the cutting head in the wood handling machine. Any deviations that are possibly shown as a result of the comparison can be utilised to provide a calibration value for each measuring result as logging continues.

Thus, as a result of the comparison, it is possible to correct both the end result of already made measurements and any future measuring values provided by the cutting head with the quantity obtained from the measuring signal field for the purpose of calibrating a mechanical measuring device of timber.

This type of comparison can be performed at regular intervals while logging continues or substantially continuously during the operation of the cutting head of the wood handling machine. In the latter practice, a sudden change in a measuring value can initiate an immediate comparison with the quantities obtained from the measuring signal field and possibly a subsequent calibration of the measuring values or devices, if so desired.

The above-mentioned monitoring means are adapted to provide a measuring signal field for the determination of the physical properties of a piece of timber, in which case the monitoring means comprise at least one 2D or 3D scanner, for instance. It may comprise a scanner applying 3D technology and capable of contact-free measurement, such as a close-range laser scanner.

It is to be understood that the above description and the related figures are only intended to illustrate the present solution. The solution is thus not restricted to the embodiment described above or defined in the claims, but it will be obvious to a person skilled in the art that a variety of variations and modifications are possible within the scope of the idea defined in the accompanying claims.

The invention claimed is:

1. A method for measuring a piece of timber in a wood handling machine, the method comprising the steps of:
   grabbing the piece of timber with a cutting head arranged on a set of booms of the wood handling machine;
   measuring the dimensions of the piece of timber with at least one measuring device in a cutting head of the wood handling machine;
   directing to the piece of timber a measuring signal field formed by one or more measuring beams with a monitoring device utilizing contact-free measurement;
   storing a point cloud produced by the measuring signal field;
   installing the monitoring device in the control cabin of the wood handling machine, for producing the point cloud;
   identifying the part of the piece to be identified, a reference level, and an end surface; from the point cloud;
   forming a three dimensional model of the part to be identified;
   defining a quantity to be measured;
   forming said quantity from the three dimensional model;

directing the obtained result to a measuring system in the wood handling machine comparing the measured quantity with the measuring value produced by the cutting head in the wood handling machine as logging continues, for the purpose of obtaining a calibration value of the measuring result;

estimating the need for correction caused by the defined calibration value of the identified piece of timber in view of the measuring data of the piece provided by the wood handling device; and correcting the measuring values obtained by the cutting head with the quantity obtained from the measuring signal field, for the purpose of calibrating a mechanical measuring device of timber.

2. The method as claimed in claim 1, further comprising the step of selecting the diameter of the end surface of the piece of timber as the quantity to be measured.

3. The method as claimed in claim 2, further comprising the step of comparing the quantities obtained from the measuring signal field with measuring values produced by the cutting head in the wood handling machine at regular intervals as logging continues.

4. The method as claimed in claim 2, further comprising the step of monitoring substantially continuously the measuring values produced by the cutting head in the wood handling machine, whereby a sudden change in a measuring value initiates the comparison of the measuring values with the quantities obtained from the measuring signal field.

5. The method as claimed in claim 2, wherein the measuring is done by at least one monitoring device based on a laser beam.

6. The method as claimed in claim 1, further comprising the step of selecting the length of the piece of timber as the quantity to be measured.

7. The method as claimed in claim 6, further comprising the step of comparing the quantities obtained from the measuring signal field with measuring values produced by the cutting head in the wood handling machine at regular intervals as logging continues.

8. The method as claimed in claim 6, further comprising the step of monitoring substantially continuously the measuring values produced by the cutting head in the wood handling machine, whereby a sudden change in a measuring value initiates the comparison of the measuring values with the quantities obtained from the measuring signal field.

9. The method as claimed in claim 6, wherein the measuring is done by at least one monitoring device based on a laser beam.

10. The method as claimed in claim 1, further comprising the steps of:

selecting the diameter of the piece of timber as the quantity to be measured in such a manner that the diameter is defined from more than one section of the length of the piece; and comparing the obtained diameter measurements with the ideal measurements of the geometry of the piece.

11. The method as claimed in claim 10, further comprising the step of comparing the quantities obtained from the measuring signal field with measuring values produced by the cutting head in the wood handling machine at regular intervals as logging continues.

12. The method as claimed in claim 10, further comprising the step of monitoring substantially continuously the measuring values produced by the cutting head in the wood handling machine, whereby a sudden change in a measuring value initiates the comparison of the measuring values with the quantities obtained from the measuring signal field.

13. The method as claimed in claim 1, further comprising the step of comparing the quantities obtained from the measuring signal field with measuring values produced by the cutting head in the wood handling machine at regular intervals as logging continues.

14. The method as claimed in claim 1, further comprising the step of monitoring substantially continuously the measuring values produced by the cutting head in the wood handling machine, whereby a sudden change in a measuring value initiates the comparison of the measuring values with the quantities obtained from the measuring signal field.

15. The method as claimed in claim 1, wherein the measuring is done by at least one monitoring device based on a laser beam.

16. An arrangement for measuring a piece of timber in a wood handling machine, comprising:

a cutting device moved by a set of booms for felling and handling a tree;

at least one set of measuring devices configured to measure at least the diameter and length of a piece of timber separated from the tree during the handling, the at least one set of measuring devices being arranged in the cutting head of the wood handling machine;

a monitoring device utilizing contact-free measurement for directing to the piece of timber a measuring signal field formed by one or more measuring beams and producing a point cloud;

a memory for storing said point cloud, wherein the monitoring device is installed in the control cabin of the wood handling machine, for producing the point cloud;

a processor configured to process data on at least one point cloud provided by the measuring signal field;

a comparison device configured to compare the measuring data provided by the point cloud with the measuring data provided by the wood handling device;

a device for estimating the need for correction caused by the defined calibration value of the identified piece of timber in view of the measuring data of the piece provided by the wood handling device; and a device for correcting the measuring values obtained by the cutting head with the quantity obtained from the measuring signal field, for the purpose of calibrating a mechanical measuring device of timber.

17. The arrangement as claimed in claim 16, wherein the monitoring device comprise a 2D scanner.

18. The arrangement as claimed in claim 16, wherein the monitoring device comprise at least one 3D scanner.

19. The arrangement as claimed in claim 16, wherein the monitoring device comprise at least one scanner applying 3D technology and capable of contact-free measurement.

20. The arrangement as claimed in claim 19, wherein the monitoring device comprise at least one close-range laser scanner.

* * * * *